(12) United States Patent
Lin et al.

(10) Patent No.: US 10,365,694 B2
(45) Date of Patent: Jul. 30, 2019

(54) PIVOT STRUCTURE ASSEMBLY AND ELECTRONIC DEVICE

(71) Applicants: Che-Hsien Lin, Taipei (TW);
Hong-Tien Wang, Taipei (TW);
Po-Hsiang Hu, Taipei (TW)

(72) Inventors: Che-Hsien Lin, Taipei (TW);
Hong-Tien Wang, Taipei (TW);
Po-Hsiang Hu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 15/599,464

(22) Filed: May 18, 2017

(65) Prior Publication Data

US 2017/0336835 A1    Nov. 23, 2017

Related U.S. Application Data

(60) Provisional application No. 62/339,067, filed on May 19, 2016.

(51) Int. Cl.
*G06F 1/16* (2006.01)
*E05D 3/06* (2006.01)
(Continued)

(52) U.S. Cl.
CPC ............. *G06F 1/1681* (2013.01); *E05D 3/06* (2013.01); *E05D 7/00* (2013.01); *E05D 11/0054* (2013.01);
(Continued)

(58) Field of Classification Search
CPC .. E05D 3/06; E05D 11/00; E05D 5/14; E05D 3/02; G06F 1/1681; G06F 1/1679;
(Continued)

(56) References Cited

U.S. PATENT DOCUMENTS 6,256,839 B1 *   7/2001   Wu ........................... E05D 3/12
                                                                  16/283
7,055,215 B1 *   6/2006   Ligtenberg ............ G06F 1/1616
                                                                  16/289
(Continued)

FOREIGN PATENT DOCUMENTS

CN    202273985    6/2012
CN    204664134    9/2015
CN    105332995    2/2016

OTHER PUBLICATIONS

English translation of CN reference.*
(Continued)

*Primary Examiner* — Mandeep S Buttar
(74) *Attorney, Agent, or Firm* — JCIPRNET

(57) ABSTRACT

A pivot structure assembly including a fixed cover and a hinge module is provided. The hinge module includes a torque element, a first shaft, a second shaft, a first bracket and a second bracket. The torque element is fixed on the fixed cover and has a first and a second axle sleeves, parallely disposed at two opposite sides of the torque element. The first shaft is disposed through the first axle sleeve, and the second shaft is disposed through the second axle sleeve. The first bracket is pivotally disposed on the torque element through the first shaft, and the second bracket pivotally disposed on the torque element through the second shaft. When the first and second brackets rotate relatively to the torque element, the first and second axle sleeves respectively provide different friction forces to the first and second shafts. In addition, an electronic device is also mentioned.

13 Claims, 14 Drawing Sheets

(51) Int. Cl.
    *E05D 7/00* (2006.01)
    *E05D 11/00* (2006.01)
    *F16C 11/04* (2006.01)

(52) U.S. Cl.
    CPC ............ *F16C 11/04* (2013.01); *G06F 1/1615* (2013.01); *G06F 1/1679* (2013.01); *E05Y 2900/606* (2013.01)

(58) Field of Classification Search
    CPC ... G06F 1/1615; F16C 11/04; B65H 2515/32; Y10T 16/2771; Y10T 16/304; Y10T 16/283
    USPC ........... 361/679.55; 16/50, 55, 68, 286, 297, 16/298, 221, 53, 273, 337; 464/68.1; 248/458
    See application file for complete search history.

(56) References Cited

U.S. PATENT DOCUMENTS

| | | | |
|---|---|---|---|
| 8,743,539 B2* | 6/2014 | Zhang | A45F 5/00 |
| | | | 292/17 |
| 9,371,676 B2* | 6/2016 | Rittenhouse | E05D 11/08 |
| 2011/0154613 A1* | 6/2011 | Chang | E05D 3/02 |
| | | | 16/273 |
| 2013/0135809 A1* | 5/2013 | Uchiyama | G06F 1/1681 |
| | | | 361/679.09 |

OTHER PUBLICATIONS

Translation for Yao reference (Year: 2014).*
"Office Action of Taiwan Counterpart Application", dated Jun. 1, 2018, p. 1-p. 7.

* cited by examiner

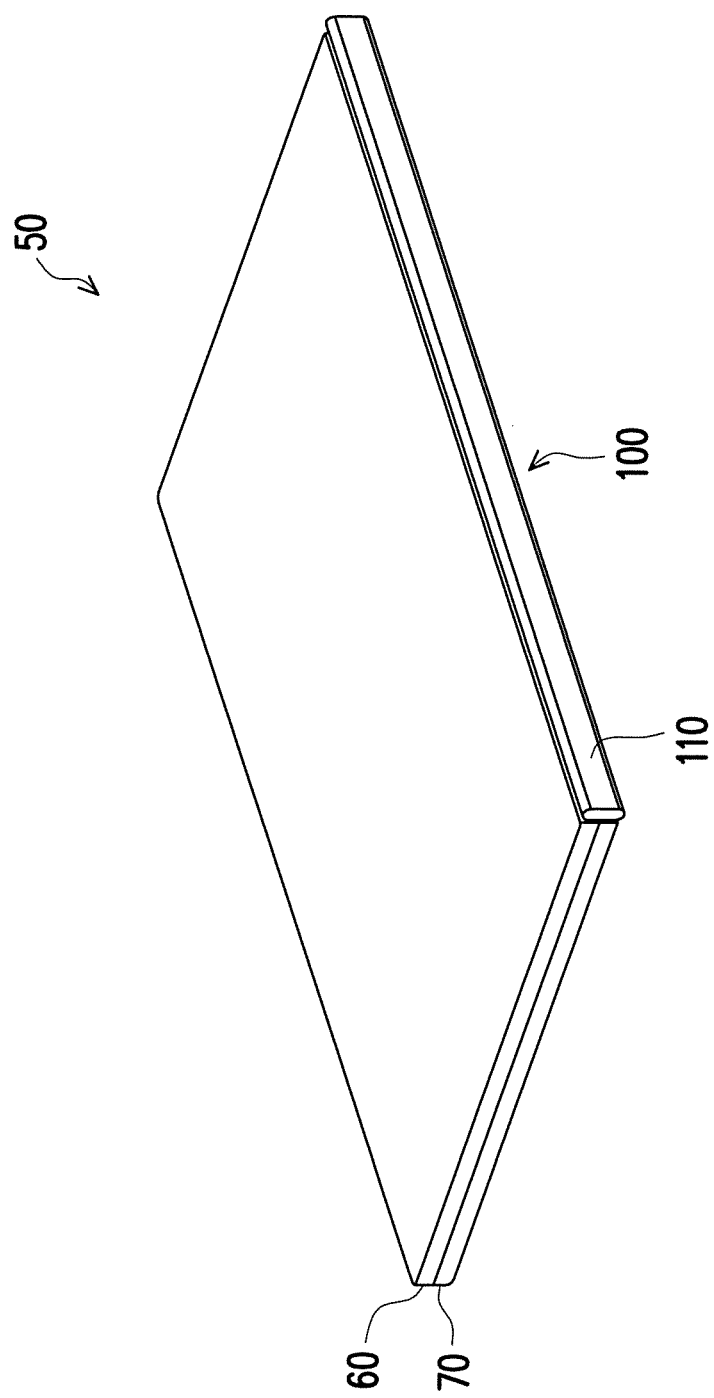

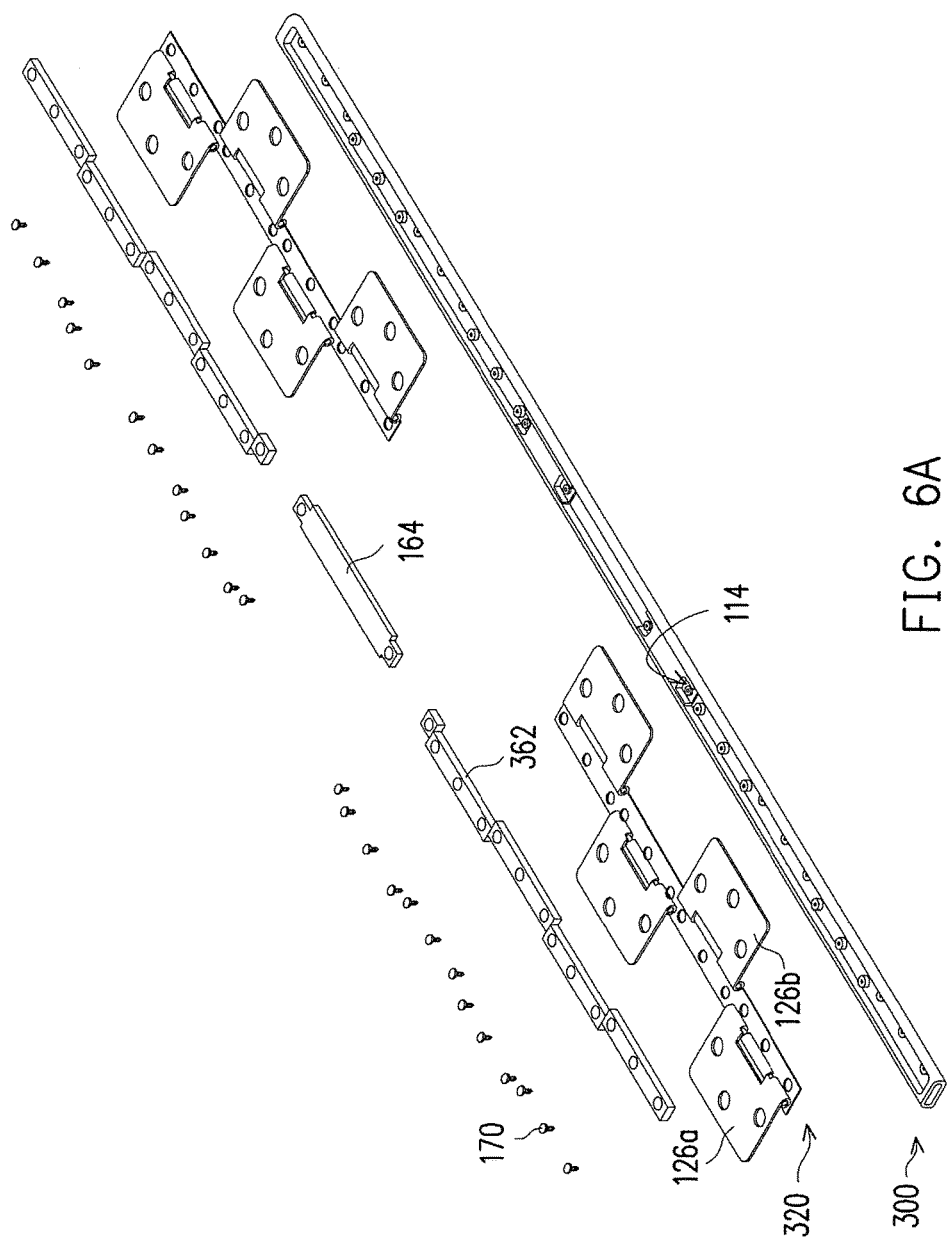

PIVOT STRUCTURE ASSEMBLY AND ELECTRONIC DEVICE

CROSS-REFERENCE TO RELATED APPLICATION

This application claims the priority benefit of U.S. provisional application Ser. No. 62/339,067, filed on May 19, 2016. The entirety of the above-mentioned patent application is hereby incorporated by reference herein and made a part of this specification.

BACKGROUND OF THE INVENTION

Field of the Invention

The invention relates to a pivot structure assembly and an electronic device, and particularly relates to a pivot structure assembly having a dual-shaft hinge module and an electronic device.

Description of Related Art

Along with development of technology, portable electronic devices, for example, notebook computers or tablet personal computers (PC) are widely applied in people's daily life. Moreover, in order to improve convenience for carrying the electronic devices, most of the present notebook computers are formed by pivotally connecting two detachable bodies. Namely, by using various pivot structures, a display device or a tablet computer device is, for example, pivotally connected to a main body having a keyboard and external connection ports, so as to facilitate a user to use in different usage states. However, the pivot structure of the electronic device such as the notebook computer, etc. generally has a plurality of hinge modules, though in design of the present pivot structure, only a single hinge module is considered without considering a composition mode of the entire pivot structure and a relative configuration mode between the hinge modules. Therefore, the pivot structure cannot match different patterns of the electronic devices to achieve an optimal design. Therefore, it is an important issue in development of the field to make the two bodies of the electronic device to pivot in a better way through an integral design of the pivot structure, so as to facilitate user's usage while considering design aesthetics of the whole electronic device.

SUMMARY OF THE INVENTION

The invention is directed to a pivot structure assembly, in which an amount of hinge modules and a configuration method thereof are adapted to be adjusted according to electronic devices of different patterns and sizes.

The invention is directed to an electronic device, which is adapted to achieve an effect of moving back and forth a body center of gravity of the electronic device through a pivot structure assembly.

The invention provides a pivot structure assembly including a fixed cover and a hinge module. The hinge module is disposed on the fixed cover, and includes a torque element, a first shaft, a second shaft, a first bracket and a second bracket. The torque element is fixed on the fixed cover and has a first axle sleeve and a second axle sleeve. The first axle sleeve and the second axle sleeve are parally disposed at two opposite sides of the torque element. The first shaft is disposed through the first axle sleeve, and the second shaft is disposed through the second axle sleeve. The first bracket is pivotally disposed on the torque element through the first shaft, and the second bracket is pivotally disposed on the torque element through the second shaft. When the first bracket and the second bracket pivotally rotate relatively to the torque element, the first axle sleeve and the second axle sleeve respectively provide different friction forces to the first shaft and the second shaft.

The invention provides an electronic device including a first body, a second body and a hinge module. The hinge module includes a torque element, a plurality of shafts and a plurality of brackets. The torque element has a plurality of first and second axle sleeves. The first and second axle sleeves are parally disposed at two opposite sides of the torque element. The shafts are respectively disposed through the first and second axle sleeves. The brackets are respectively fixed on the first body and the second body, and are respectively and pivotally disposed on the torque element through the shafts. When the brackets pivotally rotate relatively to the torque element, the first and second axle sleeves respectively provide different rotation torques to the brackets through the shafts.

In an embodiment of the invention, the first axle sleeve and the second axle sleeve respectively have a position-limiting notch. The position-limiting notches are disposed at side edges of the first axle sleeve and the second axle sleeve.

In an embodiment of the invention, the first bracket and the second bracket respectively have a third axle sleeve and a fourth axle sleeve, which are respectively disposed adjacent to the first axle sleeve and the second axle sleeve. The first bracket and the second bracket respectively sleeve the first shaft or the second shaft through the third sleeve and the fourth sleeve.

In an embodiment of the invention, the third sleeve and the fourth sleeve respectively have a first position-limiting flange and a second position-limiting flange corresponding to the first position-limiting notch and the second position-limiting notch, so as to limit a pivot angle of the first bracket and the second bracket relative to the torque element.

In an embodiment of the invention, the pivot structure assembly further includes a cover element. The cover element is fixed on the torque element and the fixed cover.

In an embodiment of the invention, the fixed cover has a plurality of concave-convex structures, and the cover element has a plurality of convex-concave structures disposed corresponding to the concave-convex structures. The concave-convex structures are fitted in the convex-concave structures.

In an embodiment of the invention, the axle sleeves respectively have a position-limiting notch. The position-limiting notches are disposed at side edges of the axle sleeves.

In an embodiment of the invention, the brackets respectively have a position-limiting flange disposed corresponding to the position-limiting notch, so as to limit a pivot angle of the brackets relative to the torque element.

In an embodiment of the invention, the brackets respectively have a pair of third axle sleeves, which are respectively disposed adjacent to the first and second axle sleeves, and the brackets respectively sleeve the shafts through the pair of third axle sleeves.

In an embodiment of the invention, the brackets are symmetrically pivotally connected to two opposite sides of the torque element, respectively.

In an embodiment of the invention, the brackets are respectively pivotally connected to two opposite sides of the torque element in a misalignment manner.

In an embodiment of the invention, the electronic device further includes a fixed cover. The fixed cover covers one side of the first body and the second body. In an embodiment of the invention, the electronic device further includes a cover element. The cover element is fixed on the torque element and the fixed cover.

In an embodiment of the invention, the fixed cover has a plurality of concave-convex structures, and the cover element has a plurality of convex-concave structures disposed corresponding to the concave-convex structures, and the concave-convex structures are fitted in the convex-concave structures.

In an embodiment of the invention, the first body is a logic body, and the second body is a display body.

In an embodiment of the invention, a rotation torque of one of the brackets corresponding to the logic body is smaller than a rotation torque of another bracket corresponding to the display body.

In an embodiment of the invention, one of the shafts corresponding to the logic body is first rotated by a first predetermined angle, and another one of the shafts corresponding to the display body is then rotated by a second predetermined angle.

In an embodiment of the invention, the first predetermined angle is 90 degrees.

In an embodiment of the invention, the second predetermined angle is 90 degrees.

According to the above description, in a plurality of embodiments of the invention, the electronic device has the pivot structure assembly coupled between the first body and the second body. Moreover, the pivot structure assembly has a plurality of hinge modules, and the hinge modules respectively have a pair of shafts with different rotation torques. Therefore, the first body is adapted to be first pivotally rotated along one of the shafts with a smaller rotation torque, so as to move a center of gravity of the electronic device backward. Then, the first body is adapted to be pivotally rotated along another one of the shafts with a larger rotation torque, such that the first body is adapted to be pivotally rotated relative to the second body by 180 degrees.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic diagram of an electronic device and a pivot structure assembly according to an embodiment of the invention.

FIG. 6A is a schematic diagram of a pivot structure assembly according to another embodiment of the invention.

DESCRIPTION OF EMBODIMENTS

FIG. 1 is a schematic diagram of an electronic device and a pivot structure assembly according to an embodiment of the invention. In the present embodiment, the electronic device 50 is, for example, a notebook computer, as that shown in FIG. 1. The electronic device 50 includes a first body 60, a second body 70 and a pivot structure assembly 100. The second body 70 is disposed at one side of the first body 60. Moreover, the pivot structure assembly 100 is coupled between the first body 60 and the second body 70. In the present embodiment, the first body 60 is, for example, a logic body, and the second body 70 is, for example, a display body.

Figure 2A:
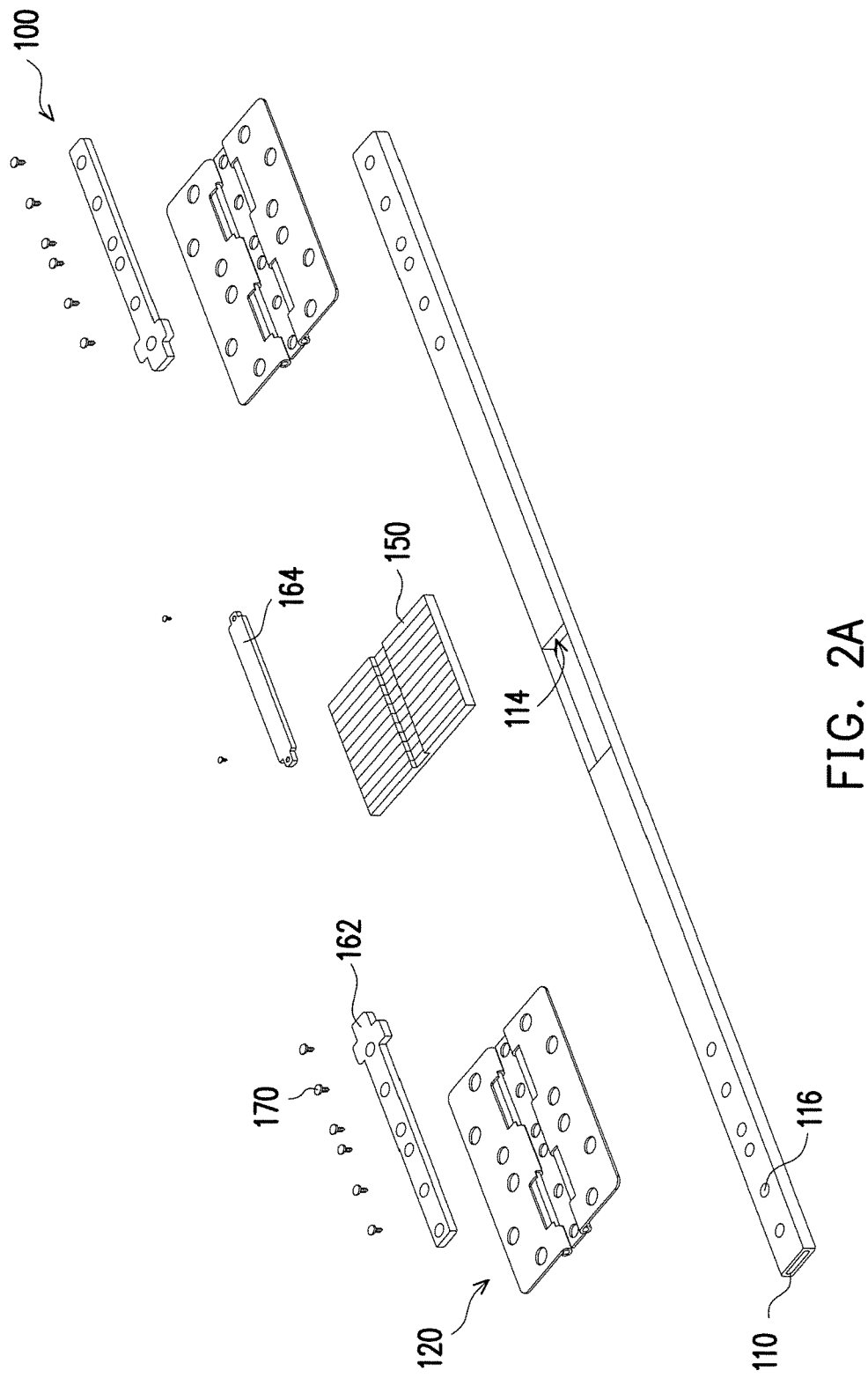
FIG. 2A is an exploded view of the pivot structure assembly of FIG. 1.
Figure 2B:
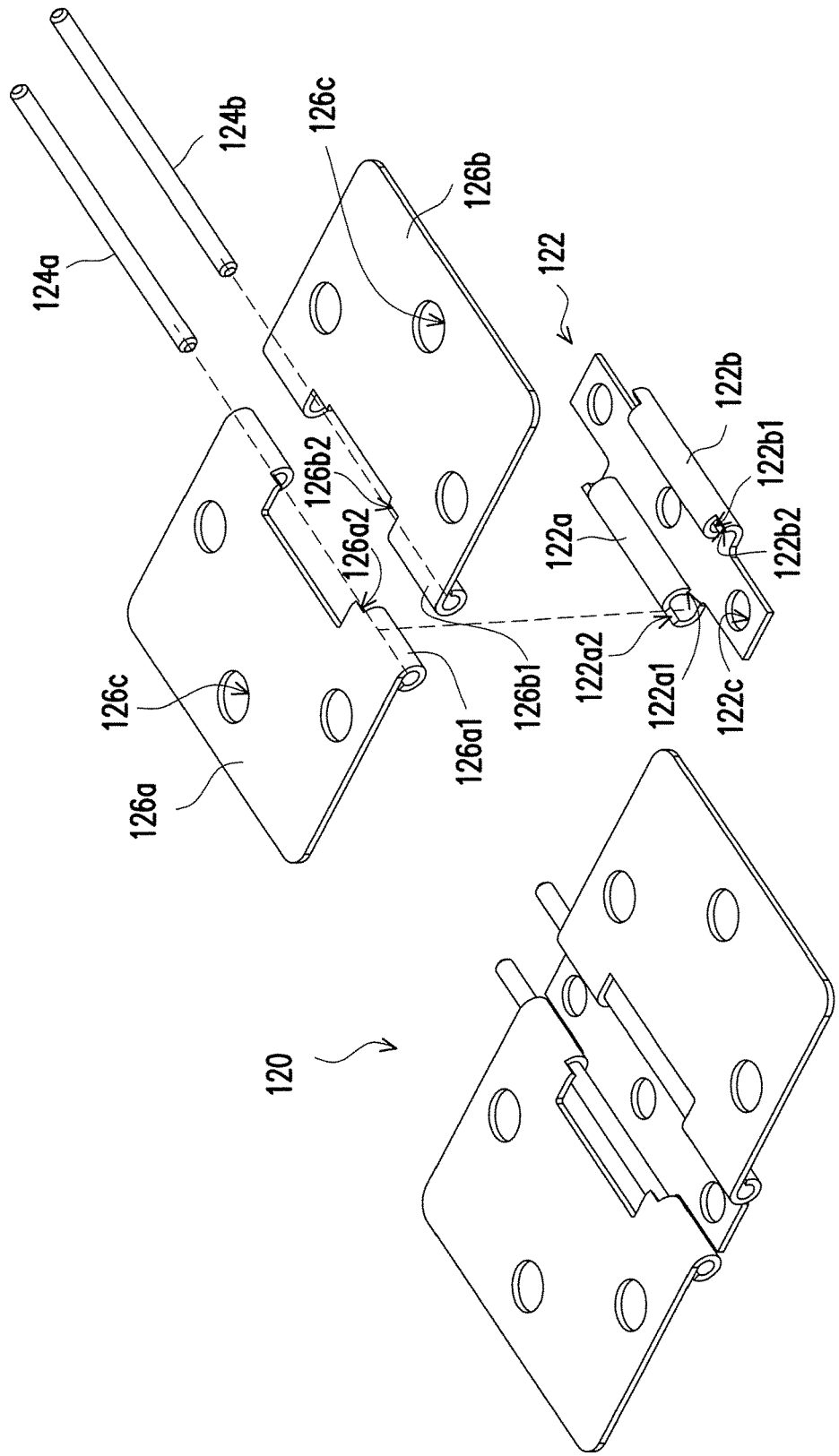
FIG. 2B is an exploded view of a hinge module of the pivot structure assembly of FIG. 2A.

FIG. 2A is an exploded view of the pivot structure assembly of FIG. 1. FIG. 2B is an exploded view of a hinge module of the pivot structure assembly of FIG. 2A. Referring to FIG. 2A, the pivot structure assembly 100 includes a fixed cover 110 and a plurality of hinge modules 120. As shown in FIG. 1, the fixed cover 110 covers one side of the first body 60 and the second body 70. The hinge modules 120 can be respectively disposed on the fixed cover 110 along an extending direction of the fixed cover 110. Referring to FIG. 2A and FIG. 2B, the hinge module 120 includes a torque element 122, and as shown in FIG. 2A, screw lock elements 170 may screw lock the torque element 122 to screw lock holes 116 of the fixed cover 110 via through holes 122c of the torque element 122. Moreover, the hinge module 120 further includes a first shaft 124a and a second shaft 124b configured in parallel, and a first bracket 126a and a second bracket 126b pivotally connected to the torque element 122 along the first shaft 124a and the second shaft 124b.

In the present embodiment, the torque element 122 has a first axle sleeve 122a and a second axle sleeve 122b. As shown in FIG. 2A and FIG. 2B, the first axle sleeve 122a and the second axle sleeve 122b are parallely disposed at two opposite sides of the torque element 122. Moreover, the first axle sleeve 122a and the second axle sleeve 122b present a round hook shape, and respectively have openings 122a1 and 122b1. Moreover, two side edges of the first axle sleeve 122a have a first position-limiting notch 122a2, and two side edges of the second axle sleeve 122b have a second position-limiting notch 122b2.

The first shaft 124a is disposed through the first axle sleeve 122a, and the second shaft 124b is disposed through the second axle sleeve 122b. Moreover, as shown in FIG. 2B, the first bracket 126a and the second bracket 126b respectively have a third axle sleeve 126a1 and a fourth axle sleeve 126b1, and the third axle sleeve 126a1 and the fourth axle sleeve 126b1 are respectively disposed adjacent to the first axle sleeve 122a and the second axle sleeve 122b. The first bracket 126a and the second bracket 126b may respectively sleeve the first shaft 124a and the second shaft 124b respectively through the third sleeve 126a1 and the fourth sleeve 126b1, so as to be pivotally connected to the torque element 122. Moreover, in the present embodiment, the first bracket 126a and the second bracket 126b are symmetrically disposed at two opposite sides of the fixed cover 110, and regarding different hinge modules 120, axes of rotation of the first shafts 124a disposed at the same side and the second shafts 124b disposed at the same side are aligned with each other.

In the present embodiment, the third axle sleeve 126a1 and the fourth axle sleeve 126b1 of the first bracket 126a and the second bracket 126b respectively have a first position-limiting flange 126a2 and a second position-limiting flange 126b2 disposed corresponding to the first position-limiting notch 122a2 and the second position-limiting notch 122b2 of the torque element 122. When the first bracket 126a and the second bracket 126b are respectively pivotally rotated relative to the torque element 122 through the first shaft 124a and the second shaft 124b, and when the first bracket 126a and the second bracket 126b are pivotally rotated by a first predetermined angle, for example, 90 degrees relative to the torque element 122, the first position-limiting flange 126a2 and the second position-limiting flange 126b2 of the first bracket 126a and the second bracket 126b may respectively lean against the first position-limiting notch 122a2 and the second position-limiting notch 122b2 of the torque element 122, such that the first bracket 126a and the second bracket 126b cannot be pivotally rotated relative to the torque element 122, continually.

As shown in FIG. 2B, the first bracket 126a and the second bracket 126b may have a plurality of through holes 126c, and the aforementioned screw lock elements 170 can be screw-locked to the first body 60 and the second body 70 of the electronic device 50 of FIG. 1 through the through holes 126c. Therefore, the pivot structure assembly 100 is respectively fixed to the first body 60 and the second body 70 through the first bracket 126a and the second bracket 126b, such that the first body 60 can be pivotally rotated relative to the second body 70 through the pivot structure assembly 100.

Referring to FIG. 2A, in the present embodiment, the pivot structure assembly 100 further has a flexible circuit board 150 electrically connected to the first body 60 and the second body 70, and the fixed cover 110 has a line groove 114 to contain the flexible circuit board 150. Moreover, cover elements 162 and 164 respectively cover surface of the torque element 122 and the flexible circuit board 150 to protect the flexible circuit board 150 and improve the appearance of the pivot structure assembly 100 and the whole electronic device 50. The cover element 162 is screw-locked to the torque element 122 and the fixed cover 110 through the screw lock elements 170, and the cover element 164 is also screw-locked to the fixed cover 110 through the screw lock elements 170, such that the flexible circuit board 150 is position-limited and fixed in the line groove 114 by the cover element 164.

As shown in FIG. 2B, in the present embodiment, sizes of the opening 122a1 of the first axle sleeve 122a and the opening 122b1 of the second axle sleeve 122b are different, such that the first axle sleeve 122a and the second axle sleeve 122b may respectively clamp the first shaft 124a and the second shaft 124b penetrating there through in different degrees of tightness. In this way, when the first bracket 126a and the second bracket 126b are pivotally rotated relative to the torque element 122, there are different friction forces produced between the first shaft 124a and the first axle sleeve 122a and between the second shaft 124b and the second axle sleeve 122b, so that the first bracket 125a sleeving the first shaft 124a and the second bracket 126b sleeving the second shaft 124b may have different rotation torques.

For example, compared to the second axle sleeve 122b relative to the second shaft 124b, the first axle sleeve 122a may provide a smaller friction force to the first shaft 124a when the first shaft 124a is pivotally rotated, such that the first shaft 124a and the first bracket 126a sleeving the first shaft 124a may have a smaller rotation torque relative to the second shaft 124b and the second bracket 126b sleeving the second shaft 124b. Moreover, the first bracket 126a can be fixed on the first body 60 serving as, for example, the logic body, and the second bracket 126b can be fixed on the second body 70 serving as, for example, the display body.

Figure 3A:
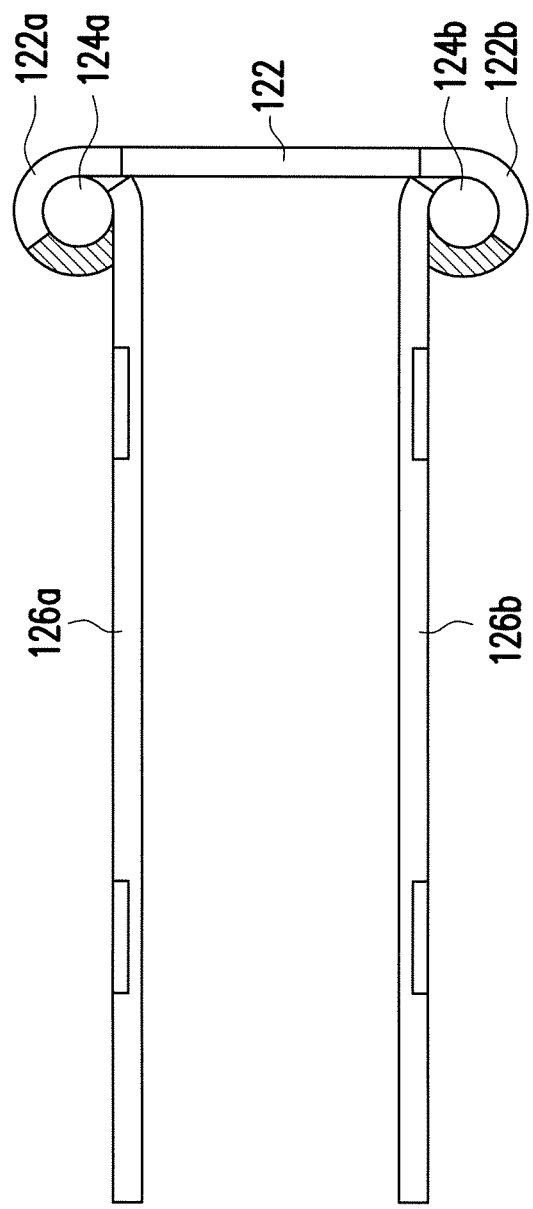
FIG. 3A, FIG. 3B and FIG. 3C are schematic diagrams of actuation modes of the hinge module of FIG. 2A and FIG. 2B.
Figure 3B:
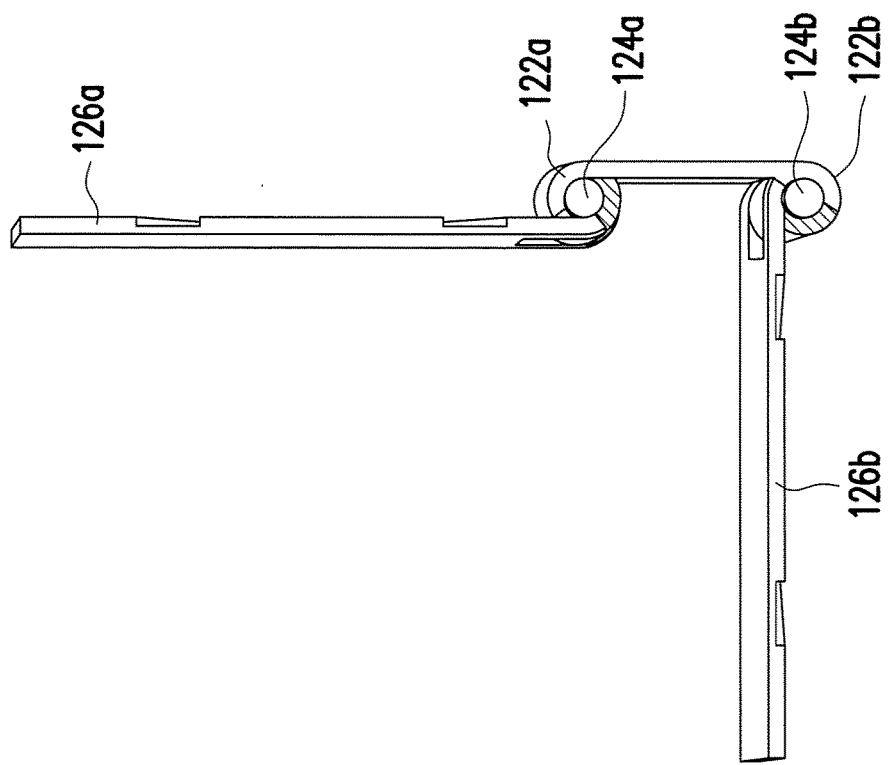
Figure 3C:
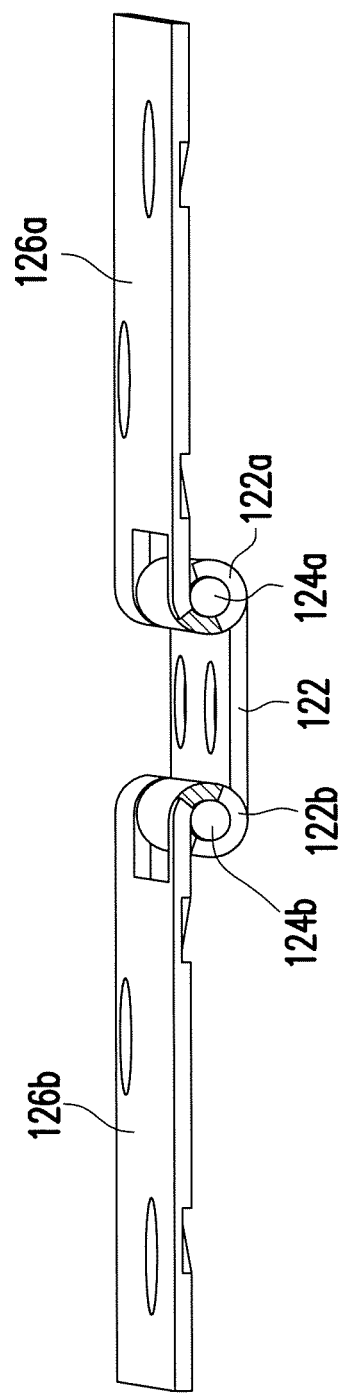

FIG. 3A, FIG. 3B and FIG. 3C are schematic diagrams of actuation modes of the hinge module of FIG. 2A and FIG. 2B. Referring to FIG. 1 and FIG. 3A, when the first body 60 is not pivotally rotated and opened relative to the second body 70, extending directions of the first bracket 126a fixed to the first body 60 and the second bracket 126b fixed to the second body 70 are parallel to each other and perpendicular to the surface of the torque element 122. As shown in FIG. 3B, when the user exerts a force to the first body 60 to open the first body 60 relative to the second body 70, since the first shaft 124a and the first bracket 126a sleeving thereon have a smaller rotation torque, the first bracket 126a can be first driven by the force exerted by the user to pivotally rotate relative to the torque element 122 and the fixed cover 110.

As shown in FIG. 3B, when the first bracket 126a is pivotally rotated relative to the torque element 122 by the first predetermined angle, for example, 90 degrees, the first position-limiting flange 126a2 of the first bracket 126a leans against the first position-limiting notch 122a2 of the torque element 122, such that the first bracket 126a cannot be pivotally rotated relative to the torque element 122, continually. Then, as shown in FIG. 3B and FIG. 3C, when the user continually exerts a force to the first body 60, the first body 60 may drive the first bracket 126a fixed thereon and the torque element 122 to continually pivotally rotate relative to the second bracket 126b fixed on the second body 70 by a second predetermined angle, for example, 90 degrees through the second shaft 124b, such that the first body 60 is continually pivotally rotated relative to the second body 70 until a pivot rotation angle of the first body 60 and the first bracket 126a fixed thereon relative to the second body 70 and the second bracket 126b fixed thereon is 180 degrees, as that shown in FIG. 3C, i.e. a sum of the first predetermined angle and the second predetermined angle, and now the electronic device 50 presents a lying down state relative to a plane where the electronic device 50 stands on.

In the present embodiment, the second shaft 124b has a bigger rotation torque relative to the first shaft 124a. Therefore, when the user pushes the first body 60, the first body 60 first drives the first bracket 126a to pivotally rotate relative to the torque element 122 along the first shaft 124a, and after the first bracket 126a leans against the first position-limiting notch 122a2 of the torque element 122 through the pivot rotation, i.e. as shown in FIG. 3B, after the first bracket 126a is pivotally rotated relative to the torque element 122 by 90 degrees, a center of gravity of the electronic device 50 is moved backward, and a larger arm of force is formed between a force exerting point of the force exerted on the first body 60 by the user and the second shaft 124b, such that the user may easily apply a larger force moment to the second shaft 124b to overcome the larger rotation torque of the second shaft 124b. Therefore, the first body 60, the first bracket 126a fixed thereon and the torque element 122 are pivotally rotated relative to the second bracket 126b and the second body 70 through the second shaft 124b until the effect that the first body 60 is pivotally rotated relative to the second body 70 by 180 degrees is achieved.

In the present embodiment, when the first body 60 is pivotally rotated relative to the second body 70 along the first shaft 124a, the first bracket 126a and the second bracket 126b may have the same or different position-limiting pivot angles relative to the torque element 122, and a sum of the position-limiting pivot angles of the first bracket 126a and the second bracket 126b relative to the torque element 122 is 180 degrees, such that the first body 60 can be pivotally rotated relative to the second body 70 by 180 degrees. Since the first bracket 126a and the second bracket 126b all have fixed position-limiting pivot angles relative to the torque element 122, when the user finishes using the electronic device 50 and wants to close the first body 60 relative to the second body 70, the first body 60 can be pivotally rotated by the fixed position-limiting angles i.e. the aforementioned first predetermined angle and the second predetermined angle through the first shaft 124a and the second shaft 124b to return to an original closing position, such that each time when the user closes the first body 60 relative to the first body 70, a closing position of the first body 60 relative to the second position 70 is consistent.

Only the pivot rotation method and steps of the first body 60 relative to the second body 70 are taken as an example for description. Similarly, the second body 70 may also be pivotally rotated relative to the first body 60 by 180 degrees according to the aforementioned method, i.e. the method of pivot rotations sequentially performed along the first shaft 124a and the second shaft 124b.

Figure 4A:
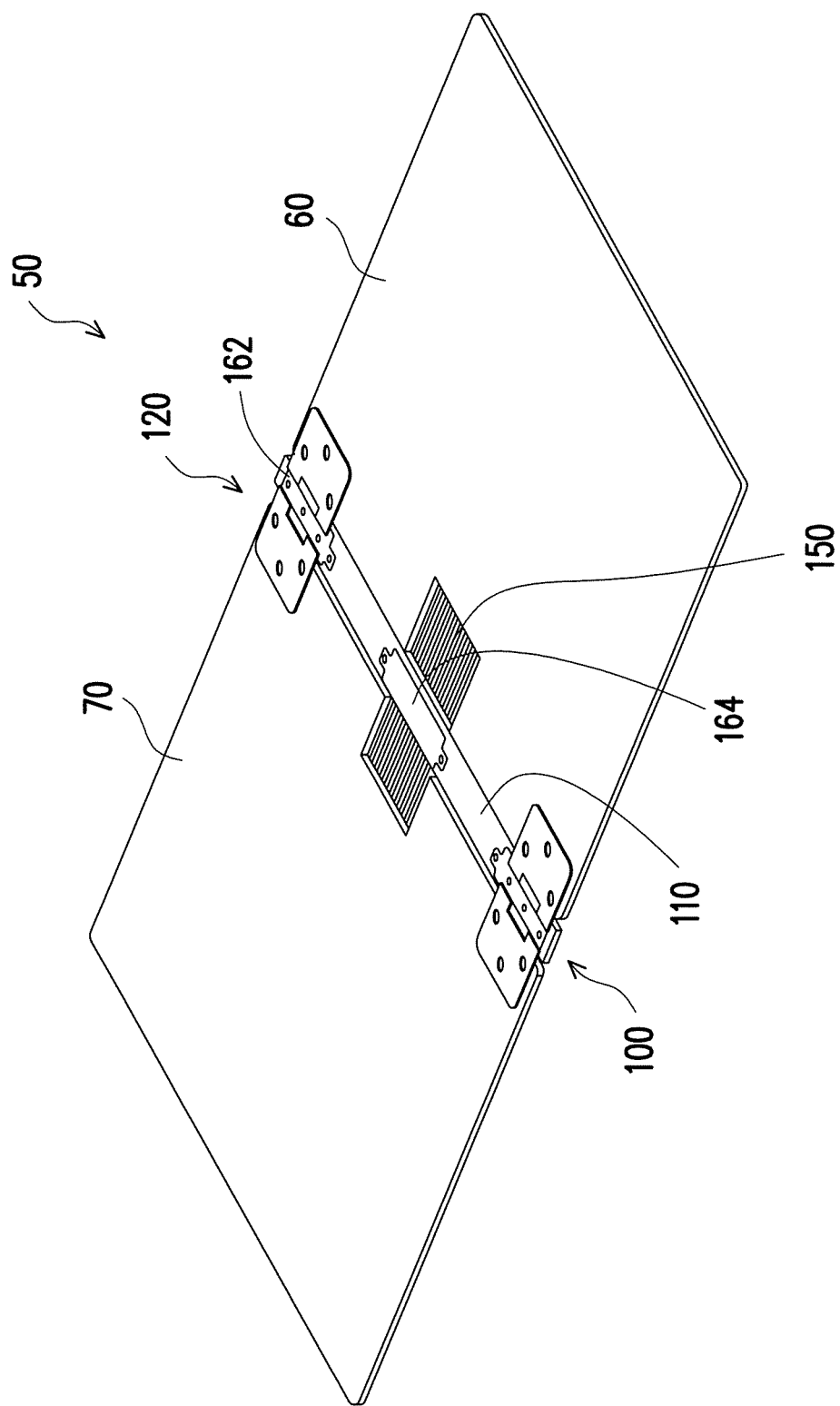
FIG. 4A, FIG. 4B, FIG. 4C and FIG. 4D are schematic diagrams of configurations of the pivot structure assembly of the electronic device of FIG. 1.
Figure 4B:
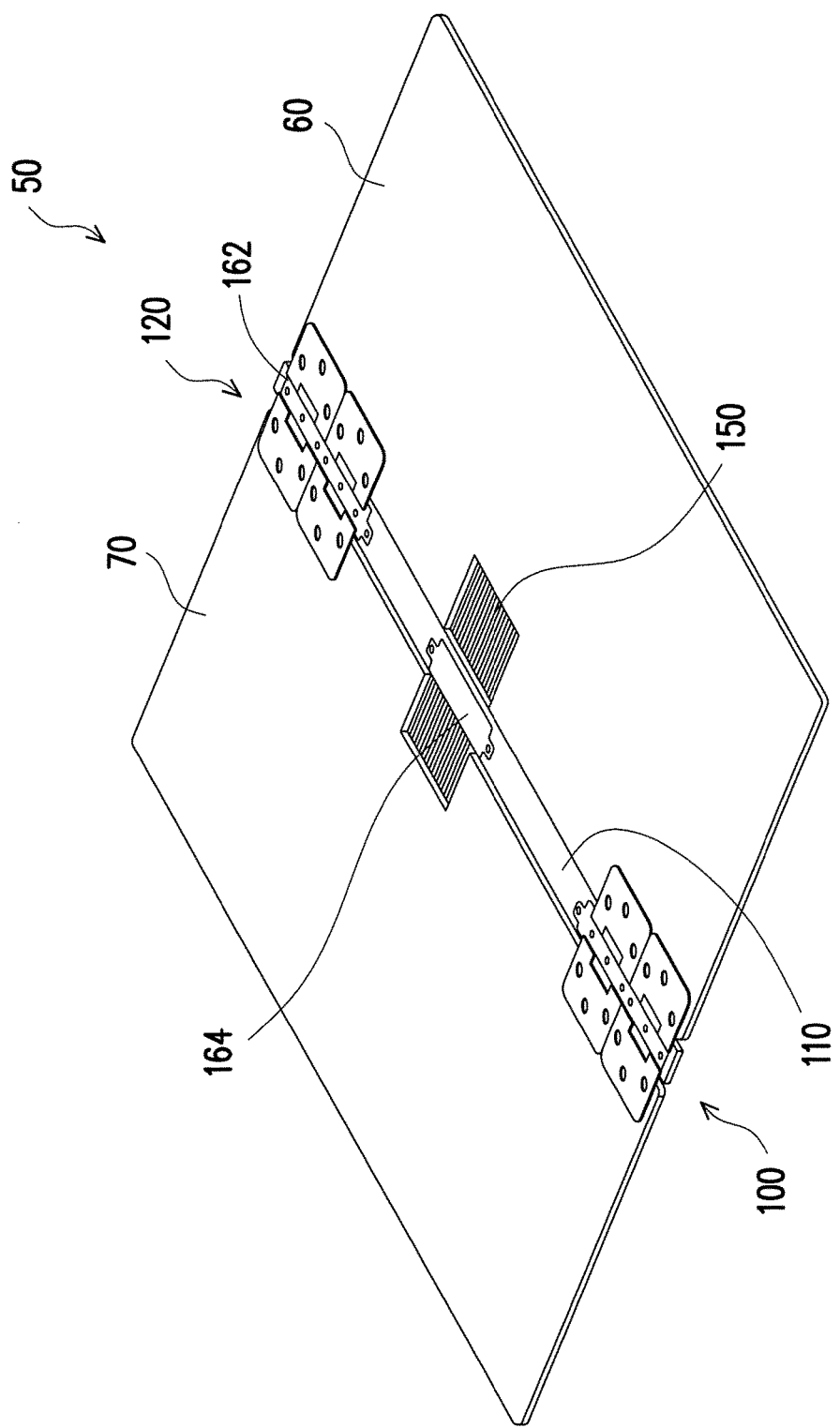
Figure 4C:
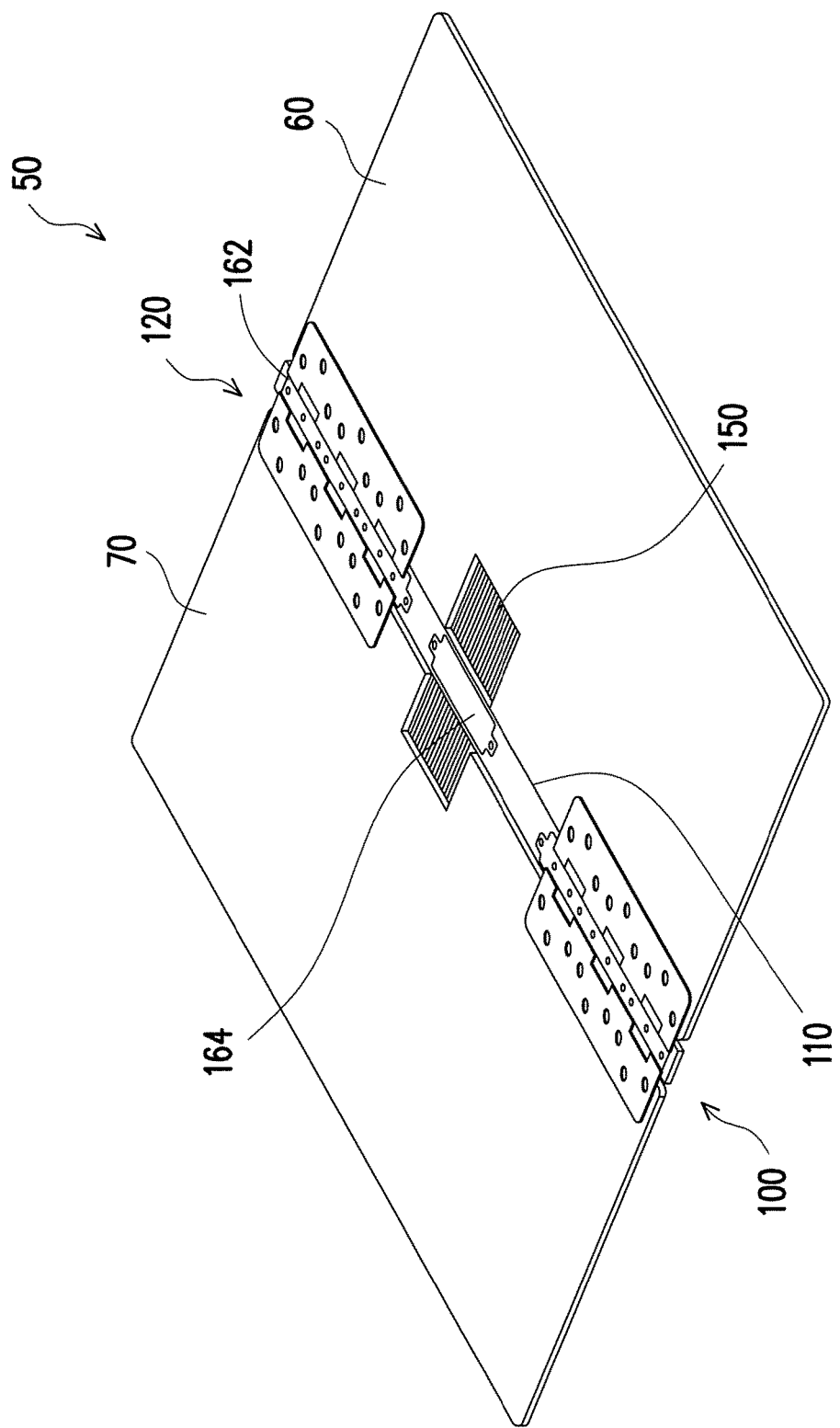

FIG. 4A, FIG. 4B, FIG. 4C and FIG. 4D are schematic diagrams of configurations of the pivot structure assembly of the electronic device of FIG. 1. Referring to FIG. 4A, FIG. 4B and FIG. 4C, as shown in FIG. 4A, the hinge modules 120 are symmetrically disposed at two sides of the fixed cover 110. Moreover, a configuration amount of the hinge modules 120 can be properly adjusted according to actual sizes of the first body 60 and the second body 70 of the electronic device 50. For example, as shown in FIG. 4B and FIG. 4C, the two sides of the fixed cover 110 can be respectively symmetrically configured with two or three hinge modules 120, so as to provide an adequate supporting force between the first body 60 and the second body 70, and avoid cracking of the hinge modules 120 during the process of pivot rotation of the first body 60 and the second body 70.

Figure 4D:
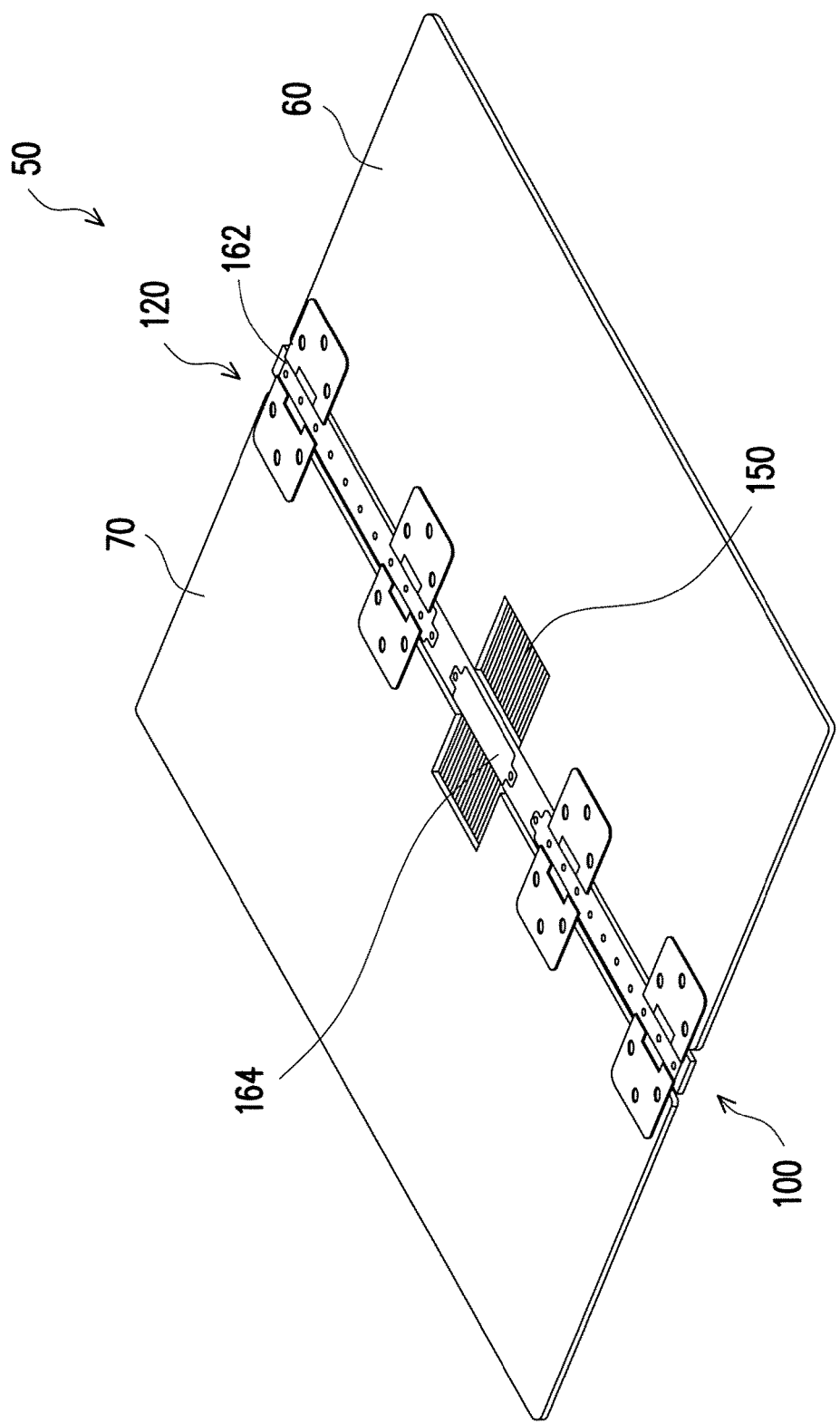

As shown in FIG. 4D, relative configuration positions and distances between the hinge modules 120 of the pivot structure assembly 100 can also be properly adjusted according to an actual requirement, such that when the first body 60 and the second body 70 are pivotally rotated relative to each other, the pivot structure assembly 100 may drive the first body 60 and the second body 70 to pivotally rotate relative to each other in a more even and stable way.

Figure 5A:
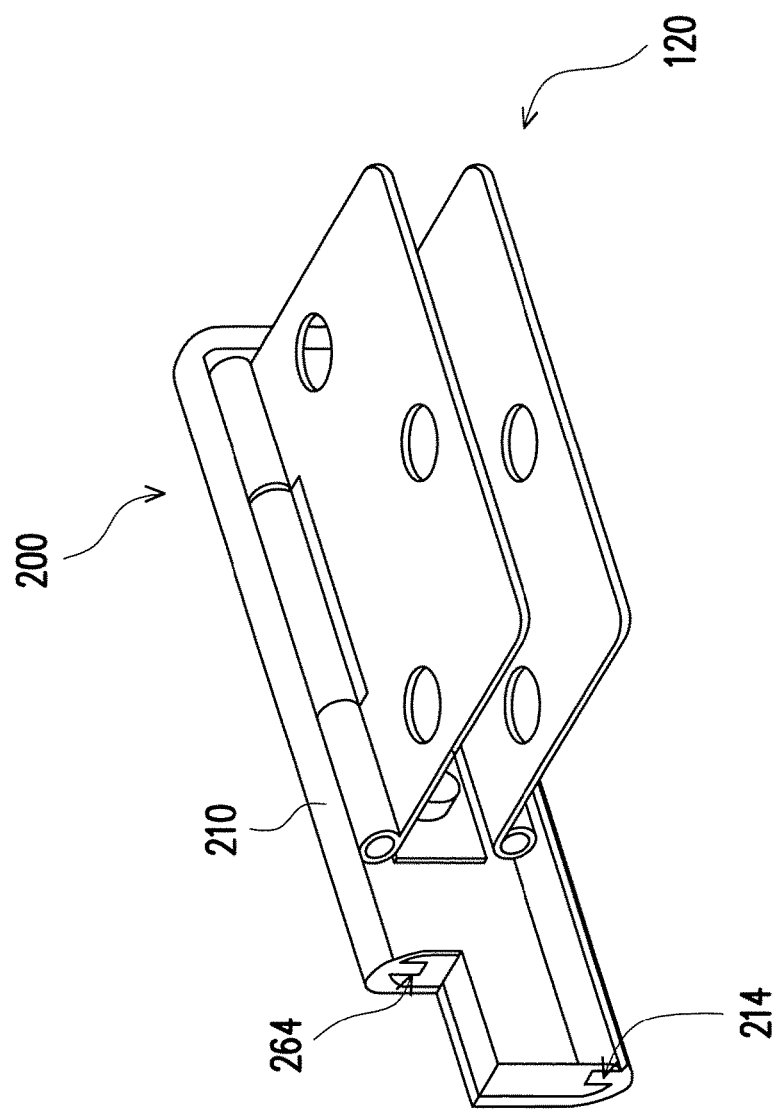
FIG. 5A is a schematic diagram of a pivot structure assembly according to another embodiment of the invention.
Figure 5B:
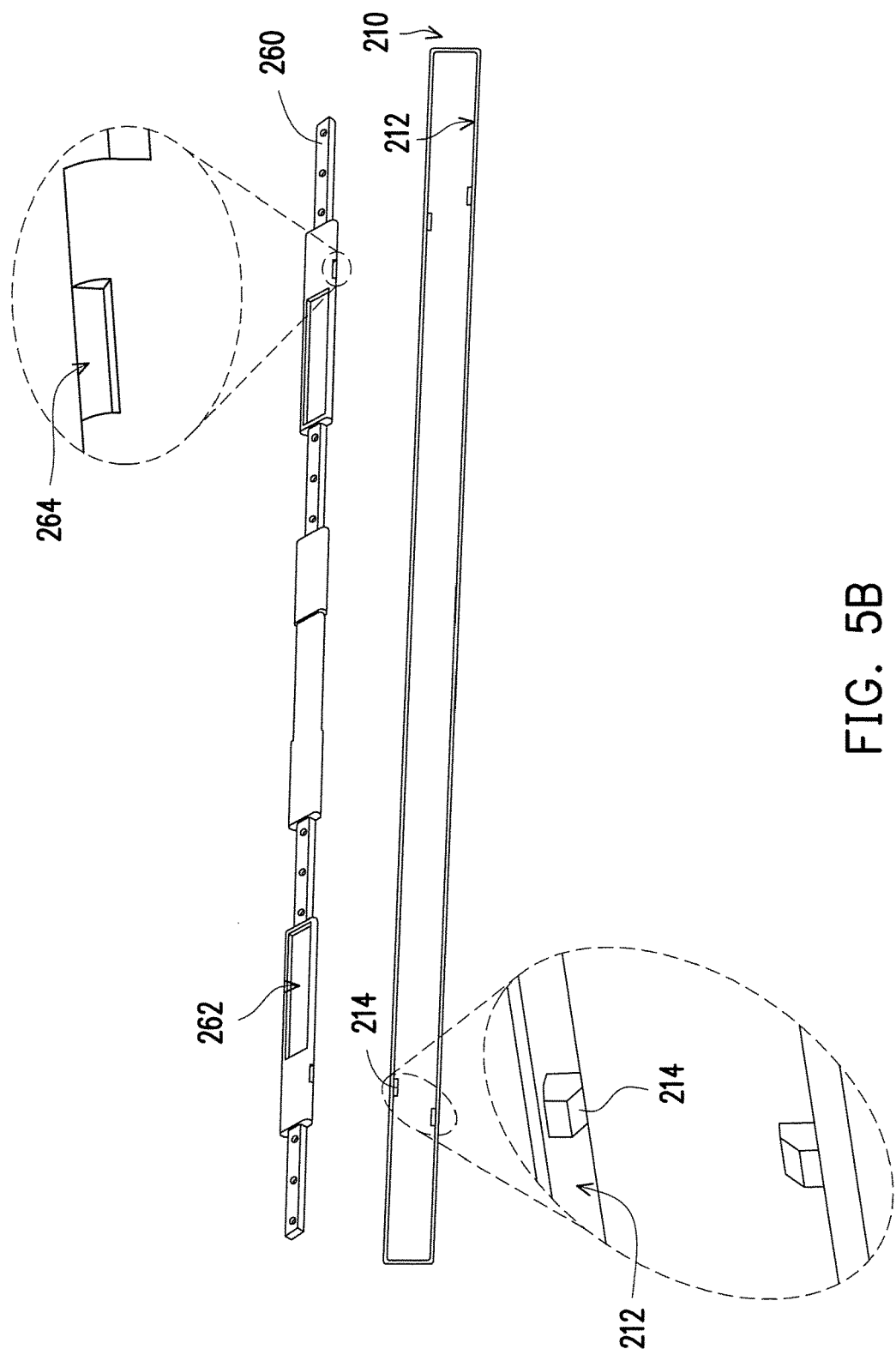
FIG. 5B is an exploded view of a part of components of the pivot structure assembly of FIG. 5A.

FIG. 5A is a schematic diagram of a pivot structure assembly according to another embodiment of the invention. FIG. 5B is an exploded view of a part of components of the pivot structure assembly of FIG. 5A. Referring to FIG. 5A and FIG. 5B, the pivot structure assembly 200 of the present embodiment is similar to the pivot structure assembly 100 of the aforementioned embodiment in structure. Therefore, the same or similar components are denoted by the same or similar referential numbers, and detail thereof is not repeated. As shown in FIG. 5B, a difference between the pivot structure assembly 200 and the pivot structure assembly 100 is that the cover element 260 of the pivot structure assembly 200 is, for example, formed integrally by using a plastic material, and the cover element 260 may simultaneously cover the aforementioned flexible circuit board 150 and the torque elements 122 of the hinge modules 120. A surface of the cover element 260 can be configured with a containing groove 262 to contain, for example, antenna elements.

In the present embodiment, the fixed cover 210 has a containing groove 212 to contain the hinge modules 120, the aforementioned flexible circuit board 150 and the cover element 260 covering the above components. Moreover, at two opposite sides of a length extending direction of the containing groove 212, the fixed cover 210 has concave-convex structures 214, and two sides of the cover element 260 have convex-concave structures 264 corresponding to the concave-convex structures 214. The concave-convex structures 214 of the fixed cover 210 can be fitted in the convex-concave structures 264 to fix the cover element 260 in the containing groove 212. Therefore, in the present embodiment, the cover element 260 is unnecessary to be fixed on the fixed cover 210 by using other screw-lock elements, and the cover element 260 itself is unnecessary to be additionally configured with screw lock through holes. Therefore, assembling components and assembling steps required by the pivot structure assembly 200 can be further deceased to decrease the manufacturing cost and assembling cost of the pivot structure assembly 200.

Figure 6B:
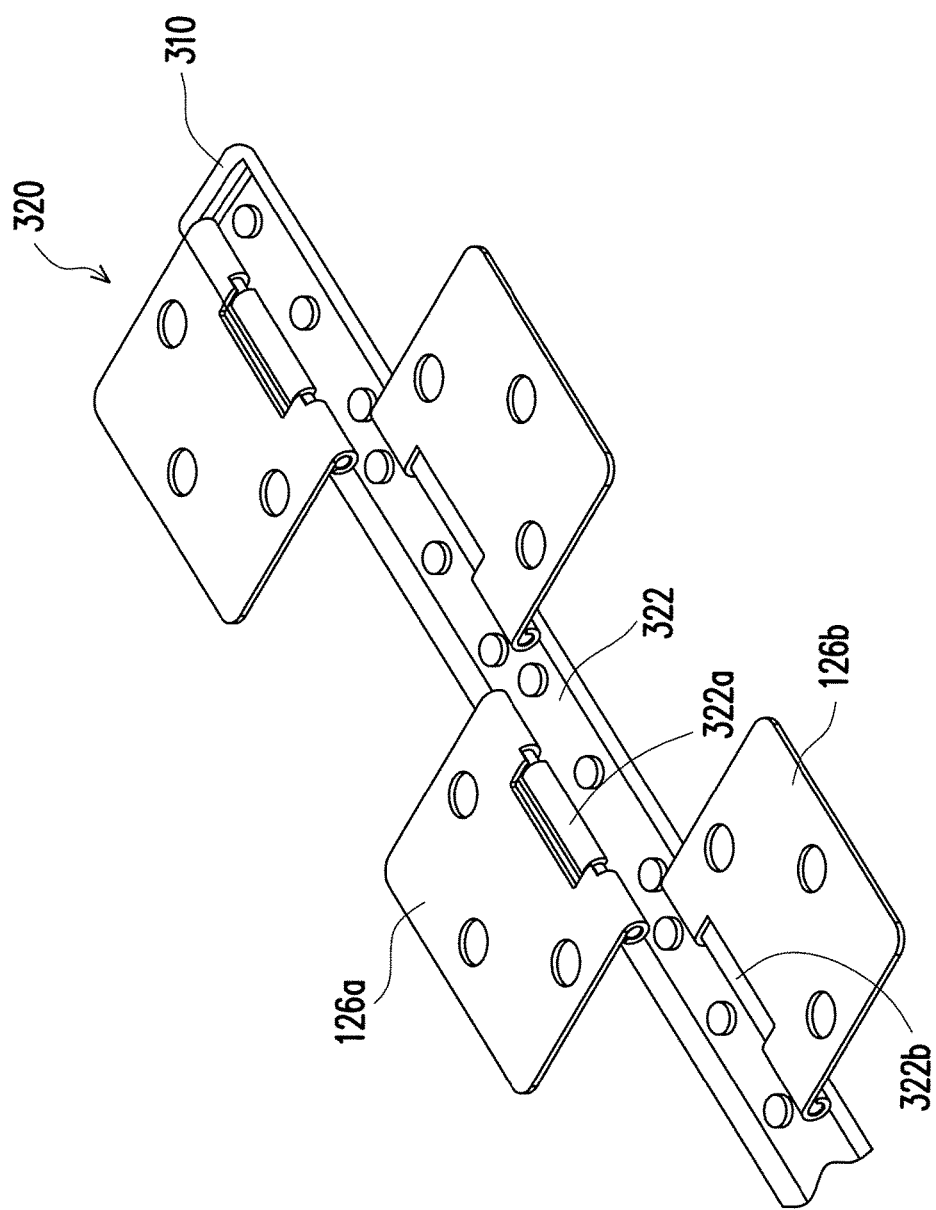
FIG. 6B is a schematic diagram of a hinge module of FIG. 6A.

FIG. 6A is a schematic diagram of a pivot structure assembly according to another embodiment of the invention. FIG. 6B is a schematic diagram of a hinge module of FIG. 6A. Referring to FIG. 6A and FIG. 6B, the pivot structure assembly 300 of the present embodiment is similar to the pivot structure assembly 100 of the aforementioned embodiment in structure. Therefore, the same or similar components are denoted by the same or similar referential numbers, and detail thereof is not repeated. In the present embodiment, a difference between the pivot structure assembly 300 and the pivot structure assembly 100 is that the first axle sleeve 322a and the second axle sleeve 322b of the torque element 322 of the hinge module 320 can be configured at two sides of the torque element 322 in misalignment. Therefore, the first bracket 126a and the second bracket 126b are respectively disposed corresponding to the first axle sleeve 322a and the second axle sleeve 322b of the torque element 322 in misalignment.

In the present embodiment, since the first bracket 126a and the second bracket 126b are respectively disposed at the two opposite sides of the torque element 322 in misalignment, the fixed cover 310 of the pivot structure assembly 300 is unnecessary to have a width adapted to simultaneously contain the first shaft 124a and the second shaft 124b. Therefore, the width of the fixed cover 310 can be further deceased, such that the fixed cover 310, i.e. the whole pivot structure assembly 300 can be applied to a notebook computer with a smaller thickness and with a light and thin design, and meanwhile the pivot manner or a support structure of the hinge module 320 are not influenced.

In summary, the pivot structure assembly of a plurality of embodiments of the invention can be coupled between the first body and the second body of the electronic device. Moreover, the pivot structure assembly has a plurality of hinge modules having dual shafts, and torques of the dual shafts of the hinge module are different. Therefore, the first body can be first pivotally rotated relative to the second body along one of the dual shafts with a smaller rotation torque, so as to reach a position perpendicular to the second body, and move a center of gravity of the electronic device backward. Then, the first body and the torque element of the hinge module can be simultaneously pivotally rotated along the second shaft with a larger rotation torque until the first body is pivotally rotated relative to the second body by 180 degrees. In a plurality of embodiments of the invention, a composition mode, a configuration amount and relative positions of the hinge modules of the pivot structure assembly can be properly adjusted according to actual sizes of the electronic device. Moreover, the brackets of the hinge module can be disposed at the two sides of the torque element in misalignment, such that the pivot structure assembly and the hinge modules can be applied to the notebook computer with a smaller thickness and a light and slim design.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A pivot structure assembly, comprising: a fixed cover; and a hinge module, disposed on the fixed cover, and comprising: a torque element, fixed on the fixed cover and having a first axle sleeve and a second axle sleeve, wherein the first axle sleeve and the second axle sleeve are parallely disposed at two opposite sides of the torque element; a first shaft, disposed through the first axle sleeve, and contacted with the first axle sleeve; a second shaft, disposed through the second axle sleeve, and contacted with the second axle sleeve; a first bracket, pivotally disposed on the torque element through the first shaft; and a second bracket, pivotally disposed on the torque element through the second shaft, wherein when the first bracket and the second bracket pivotally rotate relatively to the torque element, the first axle sleeve and the second axle sleeve respectively provide different friction forces to the first shaft and the second shaft, and the first bracket and the second bracket are respectively pivotally connected to two opposite sides of the torque element in a misalignment manner; wherein the first axle sleeve and the second axle sleeve respectively have a first position-limiting notch and a second position-limiting notch disposed at side edges of the first axle sleeve and the second axle sleeve; wherein the first bracket and the second bracket respectively have a third axle sleeve and a fourth axle sleeve respectively disposed adjacent to the first axle sleeve and the second axle sleeve, and the first bracket and the second bracket respectively sleeve the first shaft or the second shaft through the third sleeve and the fourth sleeve; and wherein the third sleeve and the fourth sleeve respectively have a first position-limiting flange and a second position-limiting flange corresponding to the first position-limiting notch and the second position-limiting notch, so as to limit a pivot angle of the first bracket and the second bracket relative to the torque element.

2. The pivot structure assembly as claimed in claim 1, further comprising a cover element fixed on the torque element and the fixed cover.

3. The pivot structure assembly as claimed in claim 2, wherein the fixed cover has a plurality of concave-convex structures, and the cover element has a plurality of convex-concave structures disposed corresponding to the concave-convex structures, and the concave-convex structures are fitted in the convex-concave structures.

4. An electronic device, comprising: a first body; a second body; and a hinge module, comprising: a torque element, having a plurality of first and second axle sleeves parallely disposed at two opposite sides of the torque element; a plurality of shafts, respectively disposed through the first and second axle sleeves, and respectively contacted with the first and second axle sleeves; and a plurality of brackets, respectively fixed on the first body and the second body, and are respectively pivotally disposed on the torque element through the shafts, wherein when the brackets pivotally rotate relatively to the torque element, the first and second axle sleeves respectively provide different rotation torques to the brackets through the shafts, and the brackets are respectively pivotally connected to two opposite sides of the torque element in a misalignment manner; wherein the axle sleeves respectively have a position-limiting notch disposed at side edges of the axle sleeves, wherein the bracket respectively have a pair of third axle sleeve respectively disposed adjacent to the first and second axle sleeve, and the bracket respectively sleeve the shafts through the pair of third axle sleeve, and the pair of third axle sleeves respectively have a position-limiting flange disposed corresponding to the position-limiting notch, so as to limit a pivot angle of the brackets relative to the torque element.

5. The electronic device as claimed in claim 4, wherein the brackets are symmetrically pivotally connected to two opposite sides of the torque element, respectively.

6. The electronic device as claimed in claim 4, further comprising a fixed cover covering one side of the first body and the second body.

7. The electronic device as claimed in claim 6, further comprising a cover element fixed on the torque element and the fixed cover.

8. The electronic device as claimed in claim 7, wherein the fixed cover has a plurality of concave-convex structures, and the cover element has a plurality of convex-concave structures disposed corresponding to the concave-convex structures, and the concave-convex structures are fitted in the convex-concave structures.

9. The electronic device as claimed in claim 7, wherein the first body is a logic body, and the second body is a display body.

10. The electronic device as claimed in claim 9, wherein a rotation torque of one of the brackets corresponding to the logic body is smaller than a rotation torque of another bracket corresponding to the display body.

11. The electronic device as claimed in claim 9, wherein one of the shafts corresponding to the logic body is first rotated by a first predetermined angle, and another one of the shafts corresponding to the display body is then rotated by a second predetermined angle.

12. The electronic device as claimed in claim 11, wherein the first predetermined angle is 90 degrees.

13. The electronic device as claimed in claim 11, wherein the second predetermined angle is 90 degrees.

* * * * *